United States Patent [19]

Nijhuis

[11] Patent Number: 4,570,297
[45] Date of Patent: Feb. 18, 1986

[54] SCRAPER BLOCK FOR AN UNHAIRING MACHINE

[75] Inventor: Gerrit J. Nijhuis, Winterswijk, Netherlands

[73] Assignee: Machinefabriek G.J. Nijhuis B.V., Netherlands

[21] Appl. No.: 676,547

[22] Filed: Nov. 30, 1984

[30] Foreign Application Priority Data

Dec. 2, 1983 [NL] Netherlands .................. 8304151

[51] Int. Cl.⁴ .............................................. A22B 5/08
[52] U.S. Cl. ............................................. 17/16; 17/18
[58] Field of Search ........................... 17/16, 17, 18, 19

[56] References Cited

U.S. PATENT DOCUMENTS 2,604,656  7/1952  Anderson et al. ................... 17/18

FOREIGN PATENT DOCUMENTS 2358977  6/1975  Fed. Rep. of Germany .
2910342  9/1980  Fed. Rep. of Germany .......... 17/16
3138891  4/1983  Fed. Rep. of Germany .

Primary Examiner—Willie G. Abercrombie
Attorney, Agent, or Firm—Arnold, White & Durkee

[57] ABSTRACT

Scraper block (1) for a dehairing machine for slaughter cattle, said block (1) comprising a thick rectangular slab (2) of elastic material reinforced by a leaf spring (3) which is incorporated inside the slab (2) over substantially the entire length and width of the slab (2) preferably in its center place, holes (7) being provided for fastening purposes which are provided with bushes (6,12) placed in holes of the leaf spring (3) for bolts or rivets (11).

4 Claims, 2 Drawing Figures

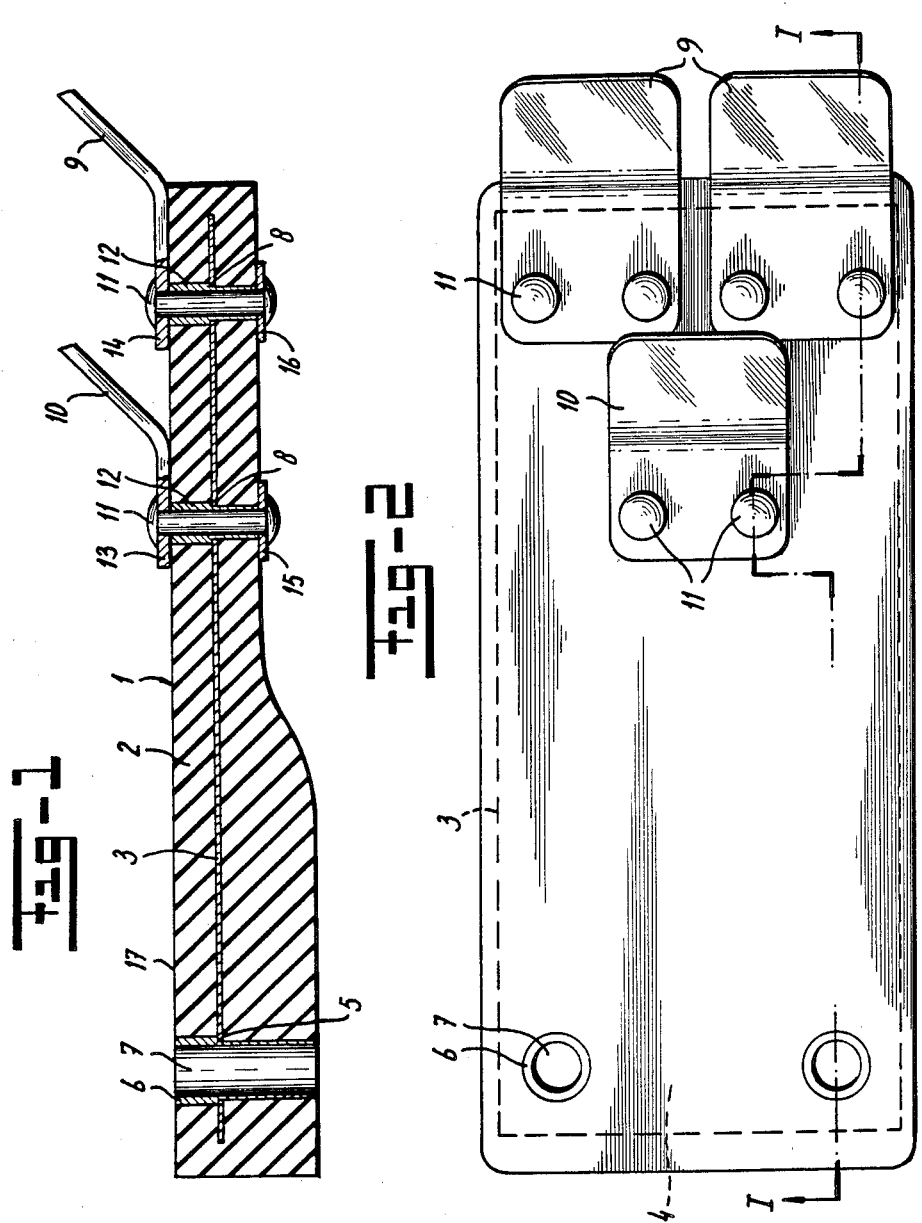

SCRAPER BLOCK FOR AN UNHAIRING MACHINE

The invention relates to a scraper block for a machine for unhairing slaughtered animals, particularly pigs, which block consists of a relatively thick, substantially rectangular slab of elastic material, such as an elastic plastics material or rubber, which is provided at one end, near one shorter transverse edge, with fastening holes and, near the opposite end, at some distance from the end edge, is provided with holes for scraper means fastened on the working surface of the slab, the latter being reinforced by means of a leaf spring.

A scraper block of this kind is known from DOS No. 3138891.

Scraper blocks are subjected to very heavy loads, because they must continuously raise and turn the carcass which is to be unhaired. In unhairing machines through which the carcasses pass in the longitudinal direction of the axis of rotation of the scraper means, the scraper blocks are most heavily loaded at the inlet of the machine, because they have to start rotating the carcass.

All known scraper blocks then also have a very short life; this applies particularly to blocks which are used in unhairing machines utilising flames or a heated medium to assist the unhairing. In practice there are practically no scraper blocks available which can withstand the unhairing of the much heavier sows.

With the known scraper block mentioned above it was attempted to obviate these shortcomings by attaching a leaf spring, which is fastened on the outer rear face of the scraper block with the aid of bolts or rivets, by which the scraper means themselves are also fastened. This leaf spring has a relatively short length and is fastened only at one end, namely at the site of the innermost scraper means. This known scraper block has the disadvantage that on the decline of the elasticity of the material of the slab, that is to say of the elastic plastics material or elastic rubber, the leaf spring cannot compensate for this loss. In addition, this known solution has the drawback that hairs are caught between the slab and the leaf spring.

Moreover, in this known construction the shortcoming occurs that the fastening bolts for the scraper means give way, that is to say they enlarge the holes in the slab and thus become loose.

The invention seeks to provide a scraper block in which these disadvantages do not occur.

According to the invention this aim is achieved in that the leaf spring is accommodated in the material of the slab, extending over practically the entire length and width of the slab, and is provided with holes corresponding with the holes for fastening the block in the machine and for fastening all the scraper means.

According to the invention the leaf spring is thus enclosed on all sides in the material of the slab and has dimensions such that all the fastening bolts pass through openings in the leaf spring. The leaf spring is thus now not situated at the side of the bending axis of the slab, but in a far more advantageous position, namely substantially where the bending centre plane is situated. Displacements of the leaf spring in relation to the slab of the scraper block can no longer occur, and hairs can no longer be caught between the leaf spring and the slab material. If the material of the slab should deteriorate through overheating and overloading, this is completely compensated by the leaf spring, which of course extends between the fastening bolts by which the scraper block is fastened in the machine and the fastening bolts of the scraper means themselves.

Loads in the transverse direction are also completely absorbed by the leaf spring.

According to the invention, bushes are preferably disposed in the holes in the leaf spring and are equipped with means by which the distance between the leaf spring and at least one end of the bushes is determined. This is preferably achieved by providing on each bush a portion having a diameter fitting into the respective hole in the leaf spring, and also a portion whose diameter is larger than that of the hole, so that a shoulder is formed on each bush, against which the leaf spring lies.

This has many advantages. In the first place the leaf spring is centered in the mould into which the plastics material or the rubber is injected under high pressure. This injection does not give rise to a displacement of the leaf spring, because as the result of the larger surface of the leaf spring on the side where the portion of the bush of smaller diameter is situated, the leaf spring is constantly pressed against the shoulder on the bush. In addition, these bushes ensure that on the fitting of the fastening bolts, and in particular on the fitting of fastening rivets, these will remain perpendicular to the plane of the leaf spring. In known scraper blocks, when use is made of rivets for fastening the scraper means, the problem frequently arises that the rivets bend out or become seated obliquely during the riveting operation.

It is preferable for the bushes to have a length slightly shorter than the thickness of the slab at the location of the bushes. It is thus ensured that during the fitting of rivets or threaded bolts the material of the slab will be compressed at the ends of the bushes and thus prestressed.

It may be observed that from DOS No. 2910342 a scraper block is known in which two layers of steel wire, extending parallel to one another and crossing each other from one layer relative to the other layer, are incorporated in the material of the slab. These steel wires serve as reinforcement, but do not act as a leaf spring and are not able to function as a spring subjected to bending loads.

Furthermore, from DAS No. 1195627 a scraper block is known in which springs, in the form of coil springs extending parallel to the longitudinal axis of the scraper block, are incorporated in the material of the slab. These coil springs are likewise not able to act as springs subjected to bending loads.

The invention will now be explained more fully with reference to the drawings.

FIG. 1 is a section on the line I—I in FIG. 2.

FIG. 2 is a top plan view of a scraper block according to the invention.

The scraper block 1 shown in the drawings consists of a slab of rubber or other suitable plastics material, optionally having reinforcing layers 2.

This slab 1 incorporates a leaf spring 3, the length and width of which are slightly smaller than the the length and width of the slab 1, as can be seen in FIG. 2.

This leaf spring 3 is provided, near the fastening end 4 of the block, with two holes 5 in which bushes 6 are placed. Each bush has a lower portion whose diameter coincides with the diameter of the hole, and an upper portion of larger diameter. A fastening bolt or rivet can be passed into the bore 7 of each bush.

Near the other end, a plurality of holes 8 are provided for scraper means 9 and 10 respectively, which are fastened in known manner with the aid of rivets, such as 11. Here again bushes, of comparable construction to the bushes 6, are disposed in the holes 8. The flat parts 13 and 14 respectively of the scraper means 10 and 9 respectively are pressed by the rivets 11 flat against the surface of the slab 1, which by means of the rivets is clamped between these flat parts 13, 14 and washers 15, 16 disposed on the other side.

It will be clear that when the leaf spring 3, together with the bushes 6 and 12, is disposed in the mould, the distance between the leaf spring 3 and the mould wall forming the surface 17 of the block will be accurately fixed.

It will also be clear that when fastening bolts or rivets are fitted and tensioned in the bores of the bushes 6 and 12 respectively, they will retain their correct position, and that when the bolts or rivets are under load they will no longer be able to become loose in their seats in the slab material of the block 1, because the bushes are effectively supported in the leaf spring 3.

Meanwhile, tests have been carried out with the scraper block according to the invention, both in the cold state and in the hot state at temperatures up to 90° C., and these tests have shown that the scraper block according to the invention does not decline in quality even after a large number of blows inflicted on it.

I claim:

1. Scraper block for a machine for unhairing slaughtered animals, particularly pigs, comprising: a relatively thick, substantially rectangular slab of elastic material, such as an elastic plastics material or rubber, which is provided at one end, near one shorter transverse edge, with fastening holes and, near the opposite end, at some distance from the end edge, is provided with holes for scraper means fastened on the working surface of the slab, the latter being reinforced by means of a leaf spring, the leaf spring being incorporated in the material of the slab and extending over practically the entire length and width of the slab, the leaf spring having holes which correspond with the holes for the fastening of the block in the machine and for fastening all the scraper means.

2. Scraper block according to claim 1, wherein: bushes are disposed in the holes in the leaf spring and are provided with means whereby the distance between the leaf spring and one end of the bushes is determined.

3. Scraper block according to claim 2, wherein: each bush has a portion having a diameter which fits into the hole in the leaf spring and a portion having a diameter larger than the respective hole in the leaf spring.

4. Scraper block according to claim 2 or 3, wherein: the length of the bushes is slightly shorter than the thickness of the slab.

* * * * *